US012621361B2

(12) United States Patent
Loukianov

(10) Patent No.: US 12,621,361 B2
(45) Date of Patent: May 5, 2026

(54) SYSTEMS AND METHODS FOR CONTROLLING HIGH SPEED VIDEO

(71) Applicant: Avago Technologies International Sales Pte. Limited, Singapore (SG)

(72) Inventor: Dmitrii Loukianov, Chandler, AZ (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 199 days.

(21) Appl. No.: 18/649,215

(22) Filed: Apr. 29, 2024

(65) Prior Publication Data

US 2024/0283835 A1      Aug. 22, 2024

Related U.S. Application Data

(63) Continuation of application No. 17/979,381, filed on Nov. 2, 2022, now Pat. No. 11,991,228, which is a continuation of application No. 17/390,324, filed on Jul. 30, 2021, now Pat. No. 11,522,931.

(51) Int. Cl.
| | |
|---|---|
| *H04L 49/40* | (2022.01) |
| *H04L 1/08* | (2006.01) |
| *H04L 41/06* | (2022.01) |
| *H04L 47/34* | (2022.01) |
| *H04L 49/90* | (2022.01) |
| *H04L 65/61* | (2022.01) |

(52) U.S. Cl.
CPC ................ *H04L 65/61* (2022.05); *H04L 1/08* (2013.01); *H04L 41/06* (2013.01); *H04L 47/34* (2013.01); *H04L 49/90* (2013.01)

(58) Field of Classification Search
CPC . H04L 65/61; H04L 1/08; H04L 41/06; H04L 47/34; H04L 49/90; H04L 69/16; H04L 12/40; H04L 12/41; H04L 69/12
USPC ...................................................... 709/219
See application file for complete search history.

(56) References Cited

U.S. PATENT DOCUMENTS

| | | |
|---|---|---|
| 2020/0245016 A1 | 7/2020 | Levi et al. |
| 2022/0086100 A1 | 3/2022 | Biederman et al. |
| 2022/0382478 A1 | 12/2022 | Park et al. |

FOREIGN PATENT DOCUMENTS

| | | |
|---|---|---|
| CN | 101151851 A | 3/2008 |
| WO | WO-2017/018993 A1 | 2/2017 |

*Primary Examiner* — Glenford J Madamba
(74) *Attorney, Agent, or Firm* — Foley & Lardner LLP

(57) ABSTRACT

Systems and methods transfer video data to an image processing system from a video source. Pixel data is received in a local buffer of a network interface controller and provided in a video transport packet. The video transport packet includes the pixel data, a media access control header and a video header. The video transport packet is received by another network interface controller that provides the pixel data directly into a video frame buffer of the image processing system.

20 Claims, 9 Drawing Sheets

SYSTEMS AND METHODS FOR CONTROLLING HIGH SPEED VIDEO

CROSS-REFERENCE TO RELATED APPLICATIONS

This application is a continuation of U.S. patent application Ser. No. 17/979,381, filed Nov. 2, 2022, which is a continuation of U.S. patent application Ser. No. 17/390,324 (now U.S. Pat. No. 11,522,931), filed Jul. 30, 2021, both of which are incorporated by reference herein their entireties.

FIELD OF THE DISCLOSURE

This disclosure generally relates to systems for and methods of implementing digital video transport in a packet data network environment, including but not limited to, environments that use high speed video transport in an Ethernet network. Some embodiments in the disclosure relate to a network interface controller configured for efficient video transport between a digital video source and a networked video processor.

BACKGROUND OF THE DISCLOSURE

Packet networks are used to distribute data packets based on address information contained within each data packet. For example, Ethernet networks transfer digital data using packets, which contain fragmented picture payload data in the form of pixel brightness values and framing and other supplementary information between the picture payload data. Processing a pixel stream received from the Ethernet network through a conventional network interface controller (NIC) into a collection of network packet data buffers in an image processing system can be inefficient due at least in part to the need to copy the fragmented payload from network buffers into the pure video buffers expected by video applications.

BRIEF DESCRIPTION OF THE DRAWINGS

Various objects, aspects, features, and advantages of the disclosure will become more apparent and better understood by referring to the detailed description taken in conjunction with the accompanying drawings, in which reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.3™ and IEEE Ethernet standard systems including but not limited to LRM, VSR, SR, MR, LR, ZR and KR. Although this disclosure may reference aspects of these standard(s), the disclosure is in no way limited by these standard(s).

Some embodiments relate to network interface controller for transferring pixel data from a video source. The network interface controller includes a Master Agent interface configured to be coupled to the video source, and a video transport accelerator configured to receive the pixel data into a local buffer and provide a video transport packet. The video transport packet comprises the pixel data, a media access control header and a video header in some embodiments.

Some embodiments relate to a network interface controller that transfers video data to an image processing system. The network interface controller includes a Master Agent interface configured to be coupled to the image processing system directly or through shared memory resources, and a video transport accelerator configured to receive a video transport packet, to identify the video transport packet and to control the Master Agent interface to write pixel data directly into a video frame buffer in memory of the image processing system. In some embodiments, the video transport packet comprises the pixel data and a media access control header and a video header.

Some embodiments relate to a method of transferring video data to an image processing system from a video source. The method includes receiving pixel data in a local buffer of a first network interface controller and providing a video transport packet stream. The video transport packet includes the pixel data, a media access control header and a video header. The method also includes receiving the video transport packet of a second network interface controller and providing the pixel data into a video frame buffer of the image processing system without involvement of a host processor of the image processing system and/or without additional software to recopying or reformatting the pixel data.

A. Video Transport Network

Figure 1:
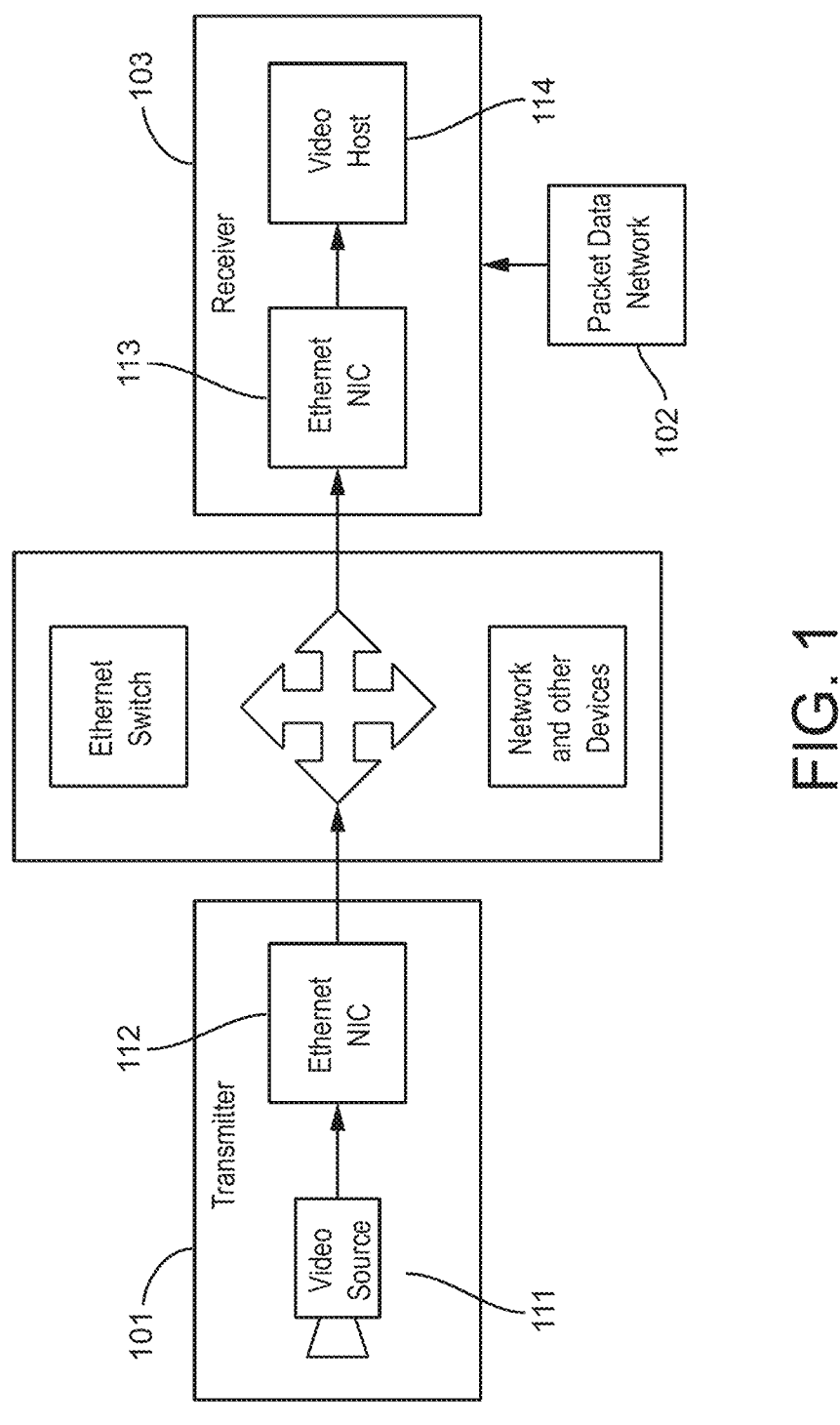
FIG. 1 is a general schematic block diagram of a video transport system according to some embodiments.

With reference to FIG. 1, a video transport network includes a video transmitter endpoint 101, packet data network infrastructure 102 routing and carrying data between connected devices, and a video receiver endpoint 103 consuming video data. Additional endpoints, such as additional transmitters and receivers can be part of the video transport network.

The video transmitter endpoint 101 includes a video source 111 in the form of a camera or media storage device, and a video-enhanced network interface controller (NIC) 112 connected to the physical network medium in some embodiments. The video source 111 is any device or system for providing data, such as video stream data. In some embodiments, the video source 111 is any source of video including but not limited to a media player, cable provider, internet subscription service, a headend, a video camera, a set top box, a sensor, a stored media server, a satellite provider, video recorders, computers, or other source of video material. The video source 111 may be coupled to NIC 112 via a parallel interface, a cable or other connection in some embodiments.

In some embodiments, the video source 111 is a camera or an image sensor implemented as a single chip or a system on chip (SOC). In some embodiments, the video source 111 includes one or more decoding units, display engines, a transcoders, processors, and a storage units (e.g., frame buffers, memory, etc.). The video source 111 may also include one or more microprocessors, digital signal processors, general purpose CPUs, application specific integrated circuits (ASICs), programmable logic devices, and/or one or more other integrated circuits in some embodiments. The video source 111 may include other components not shown in FIG. 1. For example, the video source 111 may include additional buffers (e.g., input buffers), network interfaces, controllers, memory, input and output devices, and other components for audio/video/data processing.

The packet data network may be implemented as direct connection (null network) or an infrastructure integrating packet switches, repeaters and bridges per required topology and performance goals. The other devices like peripheral units and application or function-specific processors may also be a part of network infrastructure and use it for application-specific communications.

The receiver endpoint 103 is a consumer or sink for the video data and contains a video-enhanced NIC 113 which transfers data for image processing and display functions in the video host 114. In some embodiments, the NIC 112 and/or NIC 113 are capable of extracting the pixel payload and arranging the data into a format suitable for direct processing by image signal processors, video encoders or video displays (e.g., video receiver end point 103). In some embodiments the NIC 112 and/or NIC 113 are also capable of maintaining the video data integrity and correcting or concealing the data corrupted due to packet errors or loss. In some embodiments, the NIC 112 and/or NIC 113 operate with minimum or no host CPU intervention to facilitate packet data processing at multi-gigabit data rates. The physical layers of NICs 112 and 113 are coupled to packet data network infrastructure 102 by Ethernet twisted pair cable, optical cable, or other connection in some embodiments.

Video host 114 is any device or system that consumes or generates picture data. In some embodiments, the video host

114 is an image processing system that includes a monitor which can be any type of screen or viewing medium for video signals from the video source 111. The video host 114 may be a part of or connected to an industrial machine vision system, studio production system, advanced driver assistance systems (ADAS) system, a home theater, a set top box unit, a computer, a smart phone, a smart television, a gaming system, an augmented realty system, virtual reality system or other video system.

In some embodiments, the video host 114 may be implemented as a single chip integrated circuit or a system on chip (SOC). In some embodiments, the video host 114 may include one or more decoding units, display engines, a transcoders, processors, and storage units (e.g., frame buffers, memory, etc.). The video host 114 may include one or more microprocessors, digital signal processors, CPUs, application specific integrated circuits (ASICs), programmable logic devices, or one or more other integrated circuits in some embodiments. The video host 114 can include other components not shown in FIG. 1.

The video source 111 and video host 114 may process video streams in a number of formats, resolutions and bit rates which supported by specific implementation, without changing the conceptual hardware architecture and protocol (e.g., different picture resolutions (e.g., 1080p, 4K or 8K), frame rates (e.g., 60 fps vs. 30 fps), bit precisions (e.g., 10 bits vs. 8 bits), Bayer raw pixel frames), or other video characteristics. The video host 114 is coupled to video enhanced NIC 113 via wires, or other connection in some embodiments.

The functions of video transmitters and receivers, as well as a generic data endpoints may be combined in the same physical device embodiment as required per application. Different embodiments may address the variety of practical applications. In some embodiments, the protocol takes advantage of a packetized network for its ability to interleave and carry different types of data between same or different endpoints, using the same network infrastructure and physical medium.

B. Ethernet Packetized Networks

Some of embodiments of communication systems use a physical layer of: IEEE P802.3ch for Multi-Gig (10 Gbps, 5 Gbps and 2.5 Gbps) system, IEEE 802.3 bp for 1000BASE-T1 (1 Gbps) systems, 802.3bw for 100BASE-T1 (100 Mbps) systems, Automotive Ethernet communication systems, or IEEE Ethernet standard systems including but not limited to LRM, VSR, SR, MR, LR, ZR and KR. The networked endpoints (endpoints 101 and 103 of FIG. 1) communicate by transferring data frames (packets) containing network specific headers, payload data and trailers for verifying frame data integrity. In certain applications (e.g., video applications), the payloads include a stream of pixel data. For example, streams of pixel data are communicated in a variety of applications including industrial machine vision, studio production, advanced driver assistance systems (ADAS), drone technologies, simulators, gaming and entertainment systems, augmented or virtual reality systems and other video applications. In some embodiments, the network or medium may be designed to efficiently use Ethernet infrastructure (e.g., packet data network infrastructure 102 in FIG. 1) as a universal and inexpensive medium to simultaneously carry multi-stream video and still pictures together with other traditional data and controls in industrial and automotive systems through the same wiring.

The packet data network infrastructure 102 may include any type and/or form of network and may include any of the following: a point-to-point network, a broadcast network, a telecommunications network, a data communication network, a computer network. The topology of the network may be a bus, star, or ring network topology. The network may be of any such network topology capable of supporting the operations described herein.

The network infrastructure 102 of FIG. 1 does not interpret the content of the data packets in some embodiments. The network infrastructure only optionally applies traffic shaping or prioritization to specific packets, but does not modify their application-specific content in some embodiments. Therefore, standard components may be used to implement the network infrastructure 102 in some embodiments.

In contrast, video-enhanced NICs 112 and 113 do have knowledge of video content and implement a dedicated hardware or a combination of a programmable controller unit (MCU) with firmware for implementing the operation methods defined in a video transfer protocol as explained below according to some embodiments. Some embodiments use methods discussed below in Section C to augment packet layout so that the payload pixel stream can be easily extracted from the packet buffers and copied to a frame buffer for further utilization by the image processing system (e.g., video host 114 in FIG. 1).

When implemented in the NIC hardware (e.g., of NICS 112 and 113 in FIG. 1), the systems and methods of some embodiments eliminate or reduce processing overhead associated with copying from/to the frame buffer and operate an Ethernet video transport at high network data rates (e.g., 10 gigabits/second and above as required by high definition video). The video-enhanced NICs (e.g., of NICS 112 and 113 in FIG. 1) relieve the generic CPUs on the system from fragmenting and reassembly operations and correcting errors of video data in software in some embodiments. In some embodiments, the same protocols and hardware can be used to transfer large binary buffers with automatic stripping of all headers and concatenation of payloads (e.g., for multidimensional binary buffers).

C. Native Pixel Buffers and Communication Protocols

Figure 2:
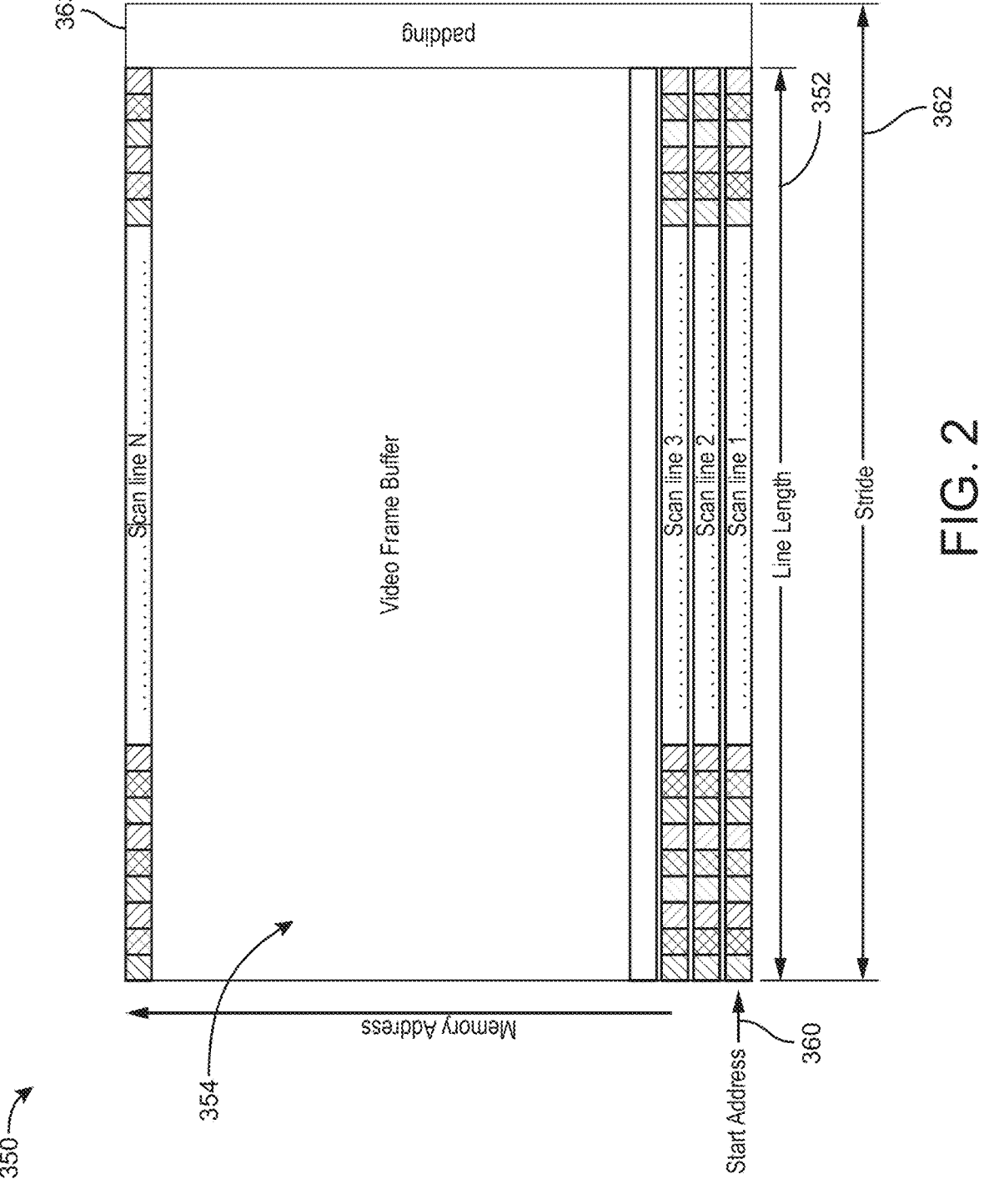
FIG. 2 is a general schematic block diagram of video frame buffer in host system memory in the video transport system illustrated in FIG. 1 according to some embodiments.

In some embodiments, systems transport uncompressed pixel data between video endpoints (e.g., image sensors or displays) and a host processors (e.g., of video host 114 or video source 111 of FIG. 1). Data is transferred from/to the natively laid out pixel data buffers in the memory (e.g., in the form of contiguous video buffers where data is stored in sequential memory locations, representing rectangular two dimensional pixel array). With reference to FIG. 2 and in contrast to other types of data, video and pictures usually are arranged as large contiguous buffers in memory which has a structure more suitable to image processing and display hardware for the video host 114 (FIG. 1) in some embodiments. A video frame buffer 350 stores pixel data 354 for an entire image or frame for the video host 114 in some embodiments.

The exemplary and customary buffer structure shown in FIG. 2 includes the pixel data 354 corresponding to raster scan lines of length 352 that are placed in sequential locations of memory starting at a software-defined start address 360. At the end of the scan line, additional padding locations 363 may be reserved to optimize the transactions on the memory interface, creating a scan line-to-line address offset equal to stride length 362. Therefore, the start address of next line in memory will be equal to buffer start address plus stride length. The memory allocation of consequent lines will be done identically. The allocation of pixel components (RGB, YUV, NV12, etc.) and pixel bit number may differ per application, but applications can follow two-dimensional array representations and store pixel data in sequential memory locations. In many embodiments, the image signal processors, displays, graphics and vision processors expect such data layout. Alternative data layouts can be utilized.

The video frame buffer 350 is larger than the maximum network packet size (e.g., Ethernet packet size), does not contain required headers and includes contiguous pixels in the pixel data 354 according to some embodiments. The size of the display (e.g., television) line lengths 352 may not also match the size of the payload in some embodiments.

Figure 3:
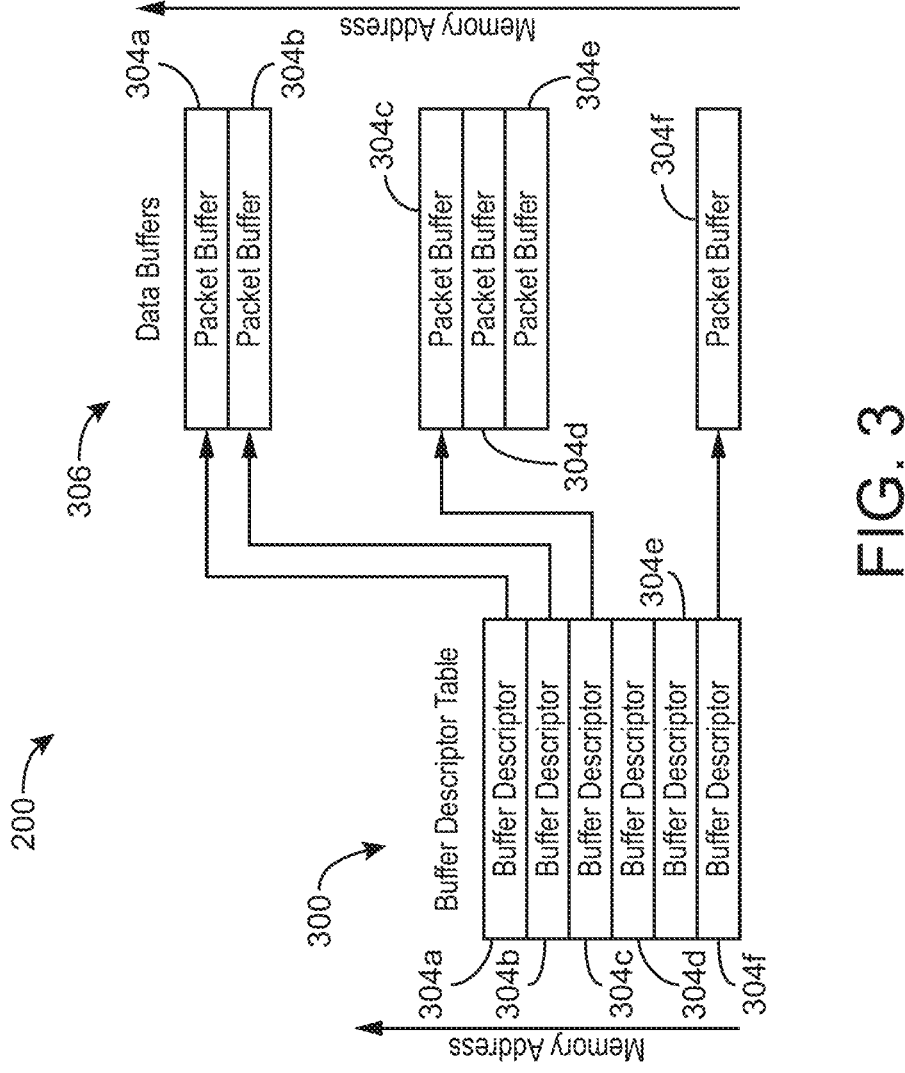
FIG. 3 is a general schematic block diagram of a set of buffers layout and a buffer descriptor table in host system memory of the video transport system illustrated in FIG. 1 according to some embodiments.

With reference to FIG. 3 and in contrast to a layout of the video frame buffer 350, the conventional Ethernet NICs transfer data between packet buffers 308a-f allocated by network stack software. The collection 306 of packet buffers 308a-f is a mix of vacant and filled buffers 308a-f managed by network software. The software maintains a buffer descriptor table 300 whose entries 304a-f point to specific packet buffers 308a-f. The NIC reads the buffer descriptor table 300 one-by-one, and on the transmit path, gets the packets from buffers 308a-f and passes the contents to transmitted network packets. On receive path, the NIC reads the addresses of vacant buffers 308a-f from the descriptor table 300, and writes the data from received packets into the buffers 308a-f pointed by descriptors in entries 304a-f. While such structures are suitable for network data transfers, the adjacent buffers 308a-f may contain data for unrelated data streams, and the buffers 308a-f internally may contain auxiliary headers and data specific to the communication protocol. The buffers 308a-f cannot be directly consumed by video processing units, and the network software needs to copy data between the collection of network buffers 308a-f and two-dimensional video buffers (e.g. video buffer 350 in FIG. 2).

Figure 5:
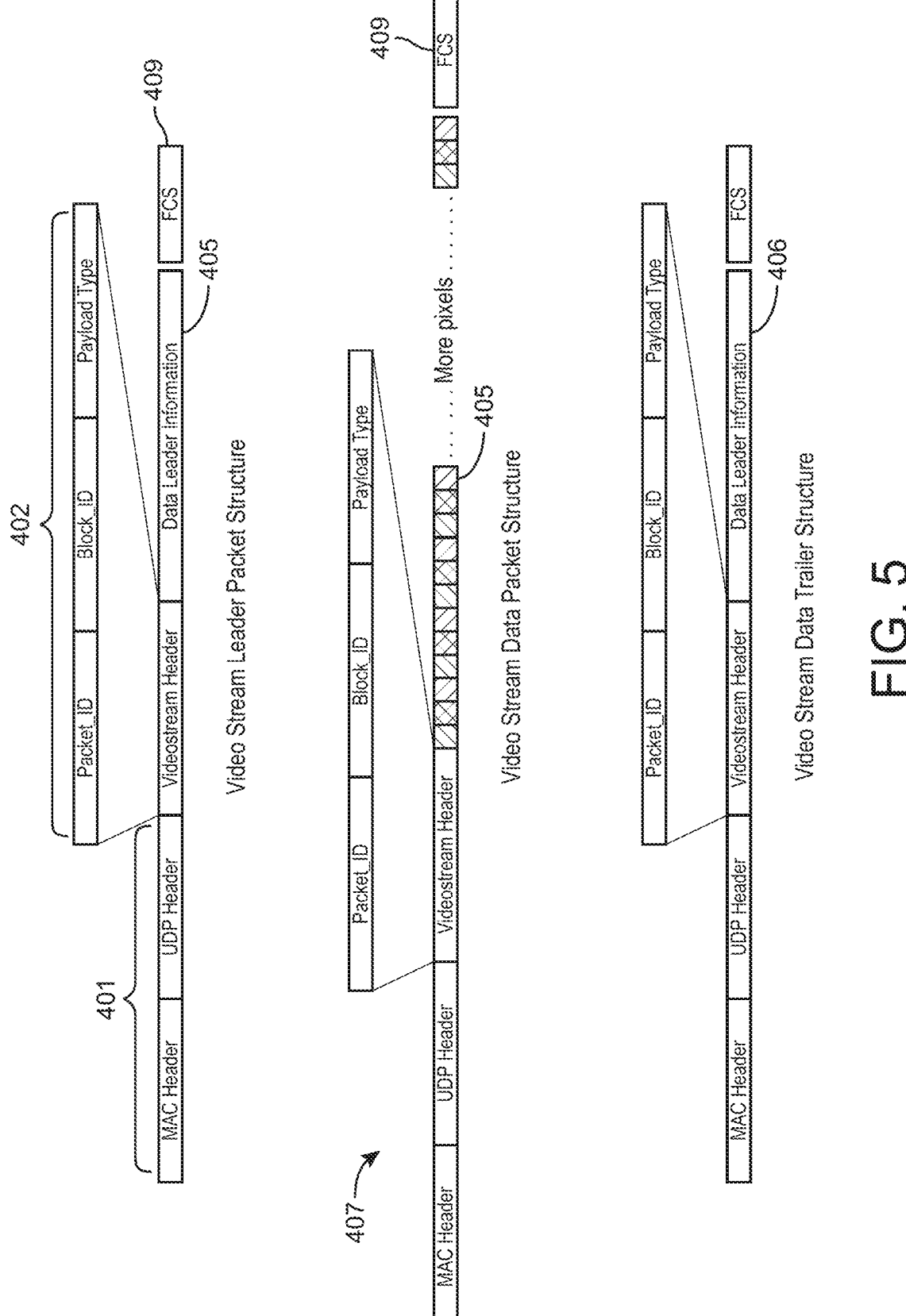
FIG. 5 is a general schematic block diagram of video stream protocol packet structures for the video transport system illustrated in FIG. 1 according to some embodiments.
Figure 6:
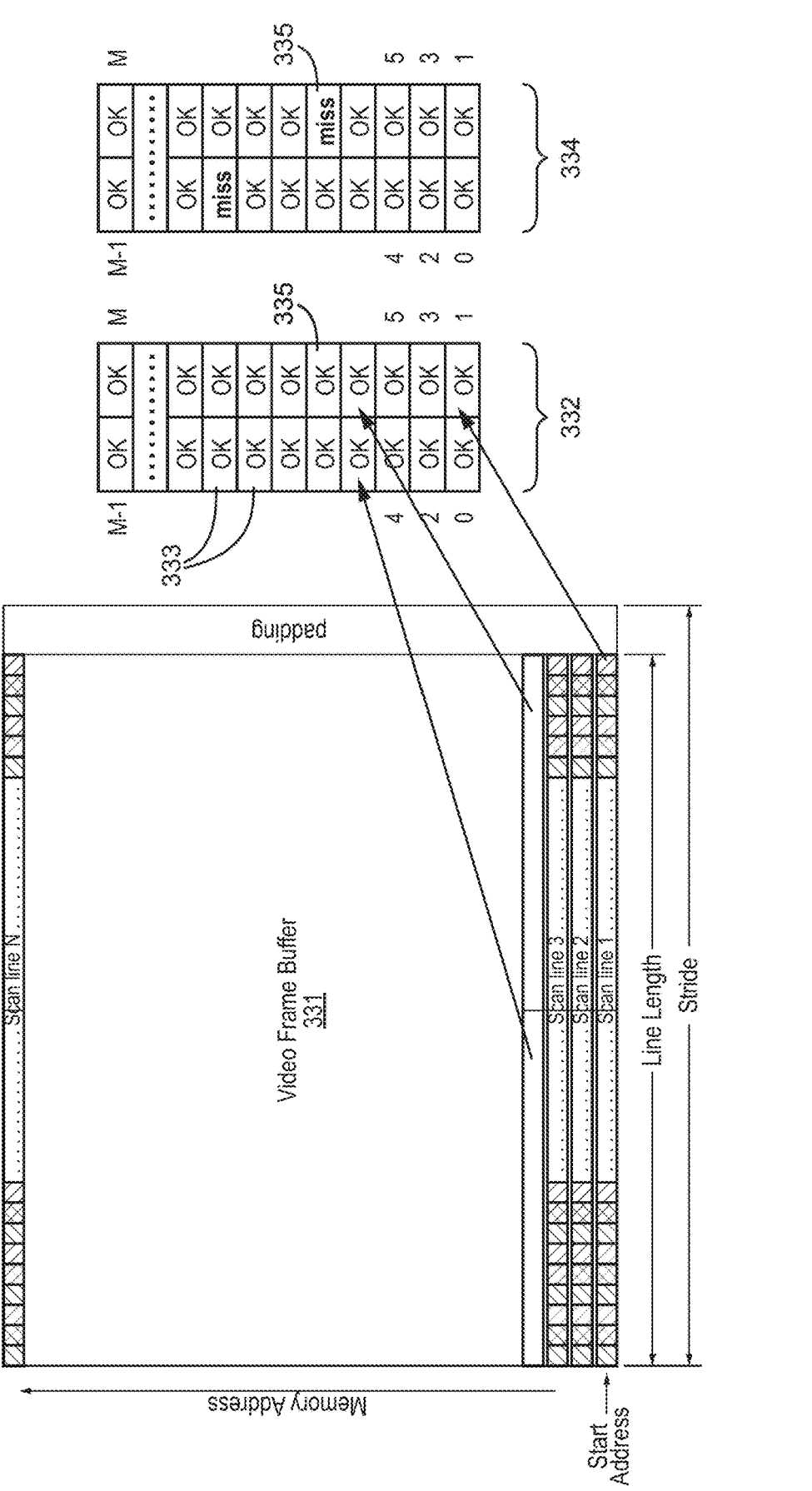
FIG. 6 is a schematic block diagram of picture buffer maps for tracking the progress of reception of the video transport packets illustrated in FIG. 4 for use in the video transport system illustrated in FIG. 1 according to some embodiments.

In some embodiments, a video-enhanced network interface controller (e.g., NICs 112 and/or 113 (FIG. 1)) is designed as described herein to take or place the data carried in payloads of video transport packets directly to/from the contiguous frame buffers, without the need to copy or reformat the data in software. The method of encapsulation of the video and control data into the network packets is defined by a video stream protocol (VSP). FIGS. 5 and 6 illustrate some embodiments of the protocol mapped to Ethernet IP/UDP transport compatible with GigE Vision specification. Other embodiments of protocols having similar functionality on other packet network types are also possible. The hardware implementation of NIC matches the data encapsulation method defined in the protocol in some embodiments.

The pixel data are sent in chunks so that the entire chunk fits into the single maximum transmit unit (MTU) frame of Ethernet, which traditionally is 1500 bytes long. When the video scan line payload is bigger than allowed network chunk, a sequence of packets (FIG. 4) including a data leader packet 411, one or more video payload chunks or packets 412 and a data trailer packet 413 is sent. In some embodiments, the block of packets 412 from data leader packet 411 to data trailer packet 413 is mapped to a Video Primitive, which can be a scan line, a block of scan lines or entire picture.

In some embodiments of VSP packets, the packets start with traditional Ethernet UDP header 401, followed by a sequencing packet identifiers 402, VSP-specific protocol data 403 and completed by standard Ethernet checksum in field 409 as shown in FIG. 5. The VSP payload packets have similar structure, but carry pixel data in the pixel payload 405.

The standard IP/UDP connection-less packet structure allows packets to pass through standard Ethernet routers and switches, and use the UDP headers to implement the quality of service (QOS) policy for video transport in the network infrastructure. The sequence numbering in the packets allows to detect the loss of the packets in the network infrastructure, and optionally implement retransmission as a corrective action.

If the packet is lost, the next non-corrupted packet needs to be placed into its required position in the video frame buffer 350 (FIG. 2), rather than just in next available memory location. If the VSP payload size is L bytes, and the line length is K bytes, the address where the packet N payload will be placed will be:

$$Addr = Start\_Addr + int(N*L/K)*Stride + frac(N*L/K),$$

Where int( ) is an integer part of the argument, and frac( ) is fractional part of the argument, and packets are numbered starting from zero. In other words, first compute how many full lines were transferred earlier (int(N*L/K)), multiply by the stride offset to factor in the padding bytes, and then add the offset for the fractional data block from last packet.

In some embodiments, the ratio of R=K/L may be an integer number (the integer number of VSP packet payloads fit in one scan line) to remove divider hardware and eliminate fractional offset for additional benefit of aligned memory access speed improvement.

The address for placing payload of any arbitrary N-th VSP packet will then be:

$$Addr = Start\_Addr + N/R*Stride$$

The further simplification is achieved when R is a power of two, and the division operator may be replaced by binary shift.

The corrupted packets, if discarded, should not create visible artifacts in the picture in some embodiments.

The discovery and setup of streaming, start, stop and tear-down of video stream are supported through another protocol—Video Streaming Control Protocol (VSCP). In the some embodiments, the VSCP may be implemented through connection-less messaging at IP/UDP level. However, other implementations are possible. In some embodiments, the stream receiver (e.g., end point 103 (FIG. 1)) will send the control messages in UDP datagrams to obtain the description of the transmitter (e.g., end point 101) in XML or other descriptive format, specify IP address and port for stream destination (receiver), specify start time and trigger transmission from the video endpoint. Other supplementary commands may be implemented to set the parameters of the endpoints and control camera sensors.

Figure 4:
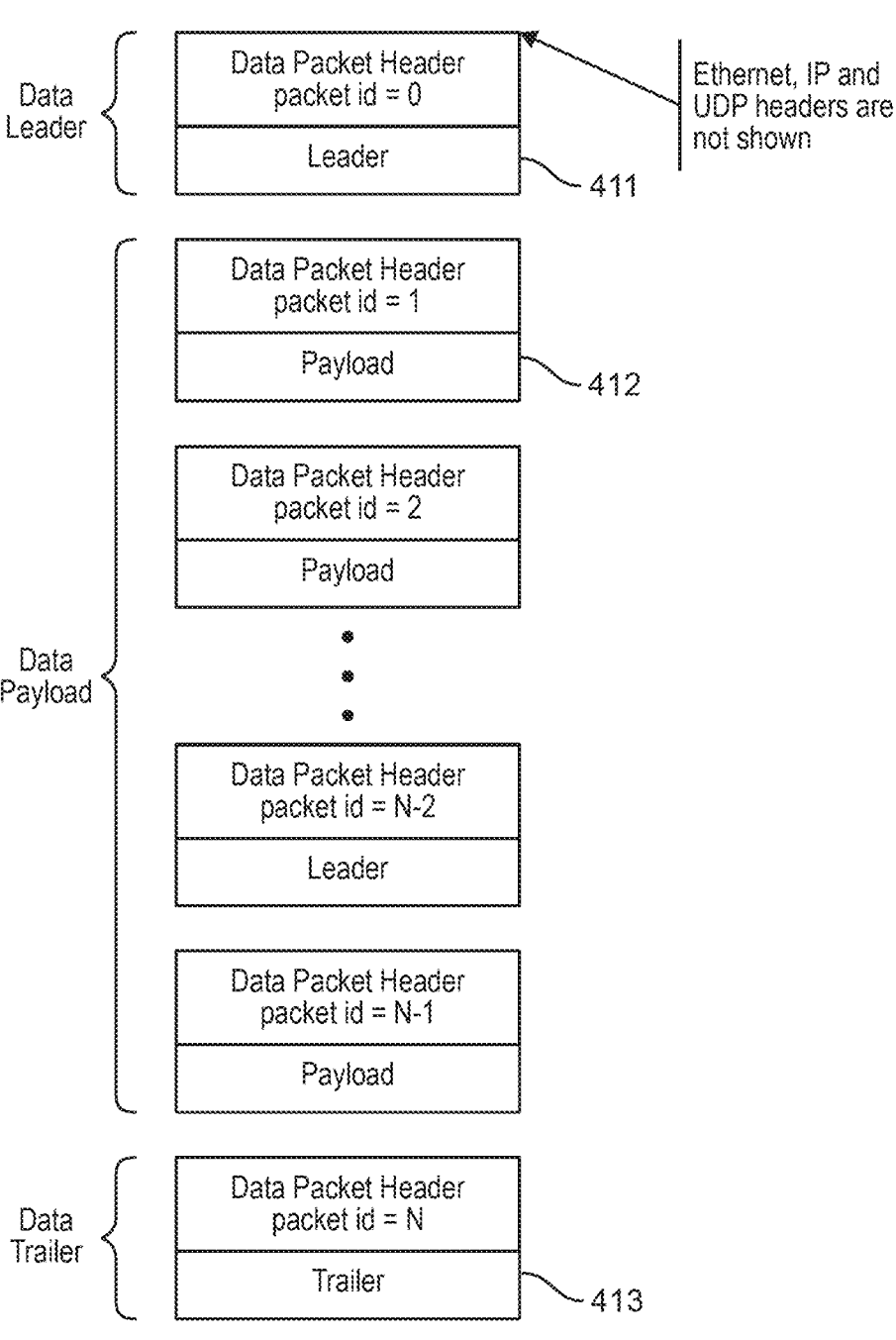
FIG. 4 is a general schematic block diagram of a sequence of packets used in the video transport system illustrated in FIG. 1 according to some embodiments.

In some embodiments, the VSCP is used to request retransmission of the missing packet in the unlikely event of packet loss in the network infrastructure. The entire Video Primitive is comprised from the chunk packets, whose numbers are incremented (FIG. 4, packets 411-413). With reference to FIG. 6 the Video Primitive is the whole picture represented by data in the frame buffer 331 in some embodiments. However, the Video Primitive can be less than the whole picture. The regions (parts of the scan lines) are mapped to the reception status table 332, where each chunk is represented by transmission status flags 333.

The mapping is guided by the ratio R, and the index in the table may be mapped to packet number N as Index=N/R. For instance, for two VSP packets per line (R=2), the index of the flags entry in the table is shown in FIG. 4).

The status flags 333 may be "invalid", "OK" or "miss" states. Before Video Primitive transmission starts, all status flags in the transmission status table are initialized to "invalid".

When the VSP delivers the chunk packet 412 with packet_ID=N and its FCS field (FIG. 5, FCS field 409) is correct, the status flags corresponding to the position N of this chunk in Video Primitive is set to "OK". If the FCS field 405 is incorrect, or the new packet with packet_ID greater than N+1 is received, the packet loss is detected and the flags 335 for the chunk are set to "miss" status. If packet correction through retransmission is enabled, the receiver NIC 113 will send the retransmission request for packet N to transmitter NIC 112. The latter will attempt to retransmit the missing chunk packet.

On reception of such packet, the FCS field 409 will be checked and the flags 335 will be updated. When the data trailer packet 413 is received, the Video Primitive reception is deemed complete, and the reception status table will end in all "OK" state (table 332) or some flags will stay in "miss" state (table 334), which would signal that the received Video Primitive contains uncorrectable errors. The video processing method may optionally use error concealment to reduce the impact of data corruption. The method of concealment is application specific and is out of scope of disclosure.

The common timebase and synchronization of pixel clocks on Ethernet video endpoints and hosts can be implemented with the methods and hardware described in IEEE 1588 standard.

D. Endpoint Implementation

The efficient video network transmitting controller builds the valid Ethernet data packet stream from the fragments of frame buffers as shown in FIG. 4 prepending transport method-specific headers and control structures, and appending padding fillers and data integrity check information according to some embodiments. The efficient video network receiving controller uses the control structures found in the Ethernet packets shown in FIG. 5 to extract the pixel payload, place the data into video-specific buffers to re-create the concatenated content identical to source buffer, and validate the integrity of delivered pixel data.

Figures 7, 8:
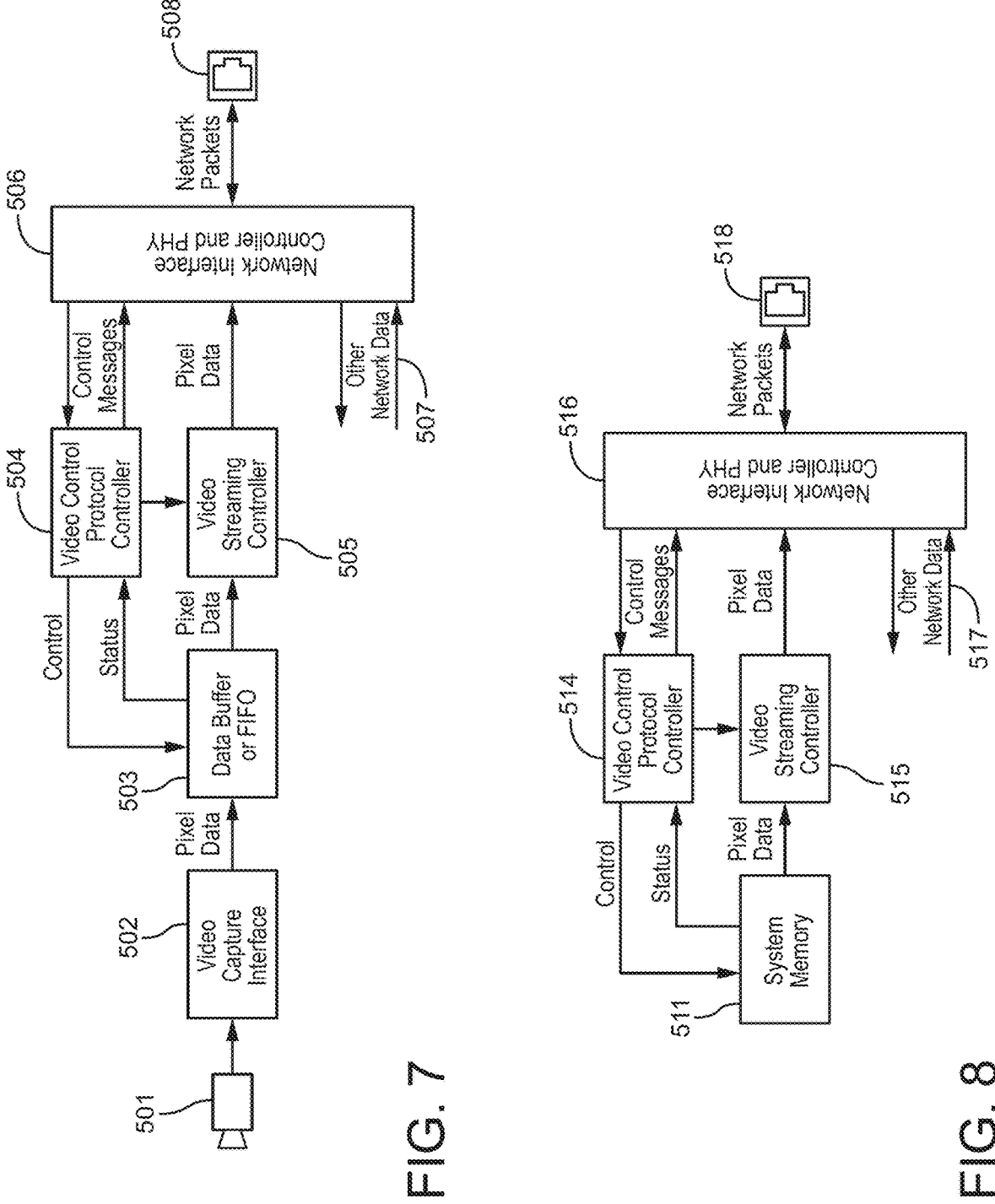
FIG. 7 is a schematic block diagram of a video source host processing system and network interface controller for use in the video transport system illustrated in FIG. 1 according to some embodiments.
FIG. 8 is a schematic block diagram of a video source host processing system and network interface controller for use in the video transport system illustrated in FIG. 1 according to some embodiments.

A camera streaming endpoint (FIG. 7) includes the image sensor with optical assembly 501, video capture interface in the form of MIPI CSI-2 or alternative camera connection 502, data buffer 503 or FIFO of storage size sufficient to temporary keep one or more payload chunks, VSP controller 505 containing hardware suitable to create the packets per FIG. 5 and pass them to Ethernet media access controller (MAC) and physical layer (PHY) 506. The latter will be attached to network medium 508. The buffer 503 receives the data from the image sensor with optical assembly 501, and temporary stores it in a way that first pixel data will be transmitted when at least entire video chunk is stored and can be quickly sent to the network at the network data rate which may be different and higher than the data rate on the image sensor interface.

The VSCP controller 514 monitors the fullness status of the data buffer 503, and triggers the VSP controller 505 to build the VSP protocol packet when enough data to fill the chunk is available. However, although the packet is sent to the network, it is not removed from the buffer 503, but stored in the shadow part of the buffer for some time to allow a time window when the chunk might be retransmitted on request from receiving endpoint.

The controller 504 also receives the VSCP messages from the network. Some of the messages (like retransmit request) may be interpreted in hardware and will trigger retransmission of a lost chunk if a retransmission request arrived within the time window when the chunk is still in the shadow area of data buffer 503. Since the size of the buffer 503 will be limited, the time window for retransmission will be limited too. Some embodiments may have the size sufficient to store 4 . . . 6 chunks to allow enough time for roundtrip delays in the transmitter and receiver buffering.

An embedded memory streaming endpoint (FIG. 8) is alternative embodiment and includes the system memory 511 temporary storing the picture generated or acquired by some other element of the system, VSP controller 515 feeding data to network controller and PHY 516. The VSCP controller 514 operates in the same way as VSCP controller 504. For example, the picture in system memory 511 may be generated by a graphic controller. Although system memory delivers pixel data to VSP controller 515 in FIG. 8, the actual mechanism of transfer may include a direct memory controller (DMA) or system fabric transaction master agent to pull the pixel data from a shared memory or resource in the system.

Figure 9:
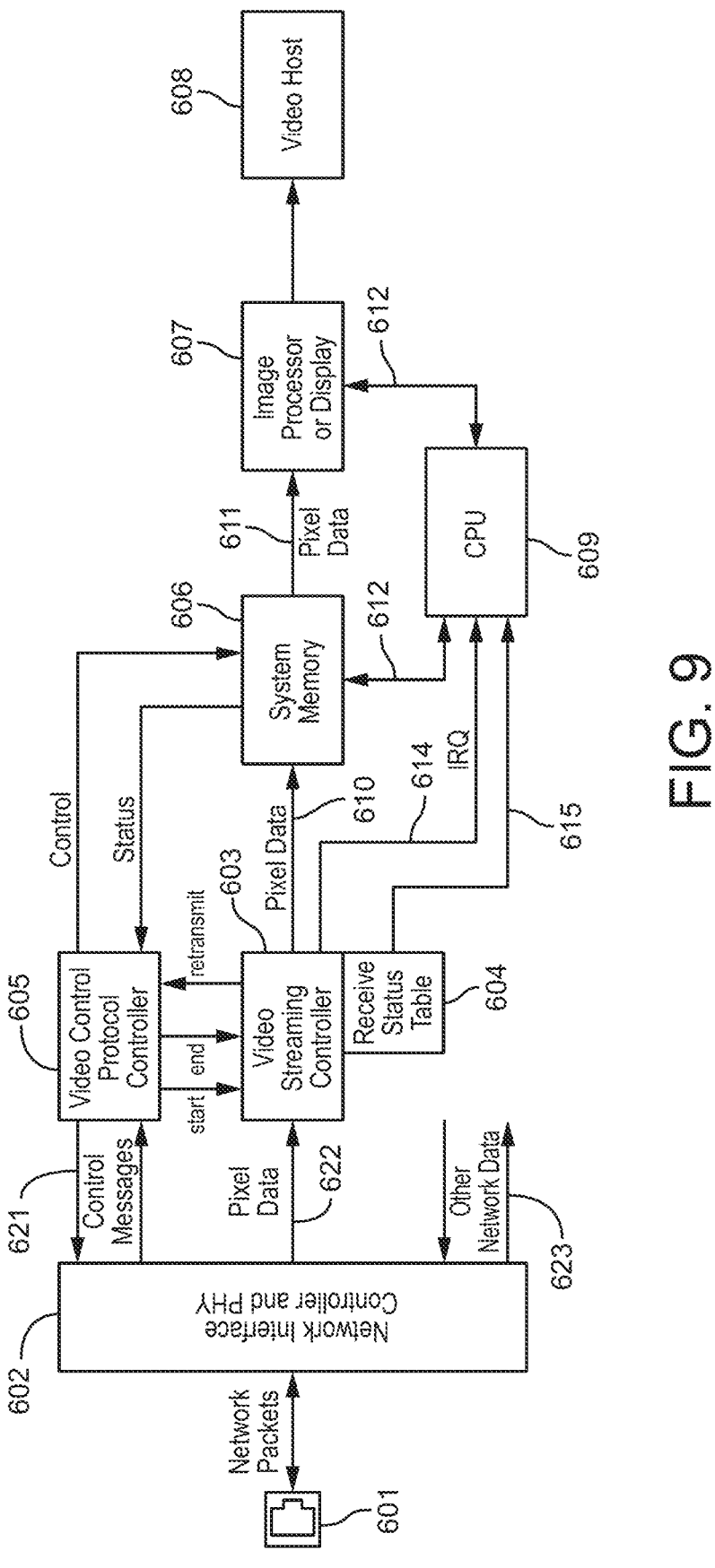
FIG. 9 is a schematic block diagram of a video destination host processing system and network interface controller for use in the video transport system illustrated in FIG. 1 according to some embodiments.

Some embodiments of a receiver are illustrated in FIG. 9. The data packets are received from the physical medium 601 by the PHY and NIC 602, whose functions are to demodulate, deserialize, separate the packets into the VSP 622, and other network 623 categories, and present them on corresponding interfaces. The video streaming controller 603 will take VSP chunk packets observing their packet_ID and place the video chunk payload into corresponding location in system memory 605. The location will be calculated from layout parameters (e.g., start address 360, line length 252, stride length 362, number of pixels per frame, etc.) of the frame buffer 350 (FIG. 2). The video streaming controller 603 also will concurrently fill the receive status table 604 (hardware embodiment of table 332 in FIG. 6)) with the flags 333 and 335 as described with reference to FIG. 6. On reception of the data trailer packet 413 (FIG. 4), the controller 603 will indicate to CPU 609 that the new Video Primitive is available by interrupt request 614. At that time, the software running on CPU will make a decision on the need of error concealment, using data from receive status table 604 via connection 615. After that, the CPU may instruct other system elements like image processor 607 to operate desired algorithm on the Video Primitive, and, for instance, display the picture on the screen 608.

The data interfaces 610, 611, 612 between components of the system may use but are not limited to, system interfaces like direct bus connection, AMBA AXI, PCI Express, HDMI, DisplayPort. The interfaces for control, status and interrupt requests may be implemented in variety of ways, including, but not limited to direct wire connections, register read/write accesses in software or message-signaled interrupts. When the receiver is implemented as a chip or board, the configuration can have functional units on this chip or module, while other functional units shown in FIG. 9 may be a part of a computer system or host device.

In some embodiments, such controllers are designed to build standard Ethernet packets while transmitting, and extract video data from received packets into video buffers with minimum or no host CPU intervention, and to eliminate the need to copy data between network and video buffers. In some embodiments, the video-enhanced network interface controller may be designed to be further capable of concealing or correcting the errors on the data transport media without host processor (e.g., central processing unit (CPU)) intervention.

Figure 10:
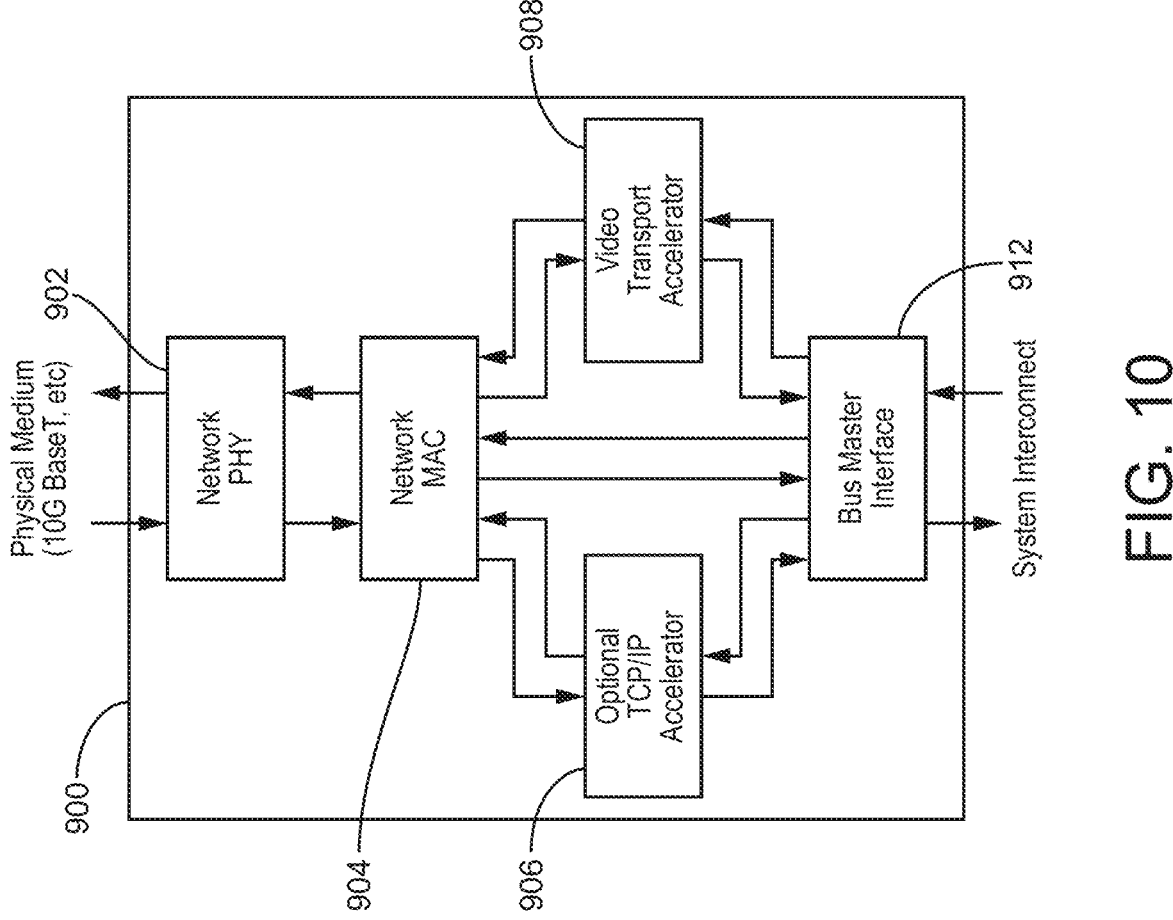
FIG. 10 is a schematic block diagram of a network interface controller for use in the video transport system illustrated in FIG. 1 according to some embodiments.

With reference to FIG. 10, a network interface controller (NIC) 900 includes a network physical layer interface 902, a network media access and controller (MAC) 904, a transmission control protocol/internet protocol (TCP/IP) accelerator 906, a video transport accelerator 908, and a master agent interface 912. The network interface controller (NIC) 900 is provided to provide high speed video transport in some embodiments. Network interface controller 900 can be provided with or be coupled with the video host 114 or the video source 111 in some embodiments. In some embodiments, separate network interface controller is associated with each of video host 114 or the video source 111.

The video enhancement described herein may be implemented using the video transport accelerator 908 inside an Ethernet network controller, where the interface 902 and network media access controller 904 function for serial data conversion, address filtering, QoS policy enforcement and FCS generation and checking and master agent interface 912 are reused. The accelerator 908 may implement video transmitter or video receiver functionality or both per application requirements.

The medium or network is attached to the physical layer interface 902 which is configured for the type of the transmission media and the speed associated with the medium. The physical layer interface 902 isolates the physical medium dependencies (PMD) and allows the remaining portions of the network interface controller 900 to have all other layers be media-independent. In some embodiments, physical layer interface 902 includes transmit and receive ports coupled to a 10G BaseT ethernet or other network. Master agent interface 912 provides a system interconnect to video host 114 or video source 111. Master Agent interface 912 can be a peripheral component interconnect (PCI) or PCI express.

The media access controller 904 is a layer for converting data structures to signals for the physical layer interface 902 interaction with the network. The media access controller 904 is integrated with the physical layer interface 902 and are implemented in hardware in some embodiments With reference to 5 and 10, the network media access controller 904 provides the video data path including the video transport accelerator 908 for processing video data in the internal buffers of the network interface controller 900. The video transport accelerator 908 controls the master agent interface 912 to read and write data from specific transport packets (e.g., video stream data packets, such as video stream data packet 407 in FIG. 5), directly into the video frame buffer 350 as shown in FIG. 2. The video frame buffer 350 contains the pixel data 354 (represented, but not limited to RGB or YUV samples) as a sequence of television scan lines. The pixel data 354 is placed in sequential locations in the video frame buffer 350. The N pixel lines construct the entire video frame buffer 350, where N is an integer. In some embodiments, a more efficient hardware implementation may require padding using padding locations 363 at the end of line lengths 352 so that start bus transactions are started aligned on power of two boundary. The video frame buffer 350 includes a start address 360 (e.g., address of the first pixel in memory), scan line lengths (e.g., number of pixels in one scan line), stride length 362 (offset from the address of a start of first line to start address of next line), and the number of lines (e.g., 1-N). When the software configures the video transport accelerator 908, the start address 360, the scan line lengths 352, the stride length 362, and the number of lines (e.g., 1-N) are provided to the video transport accelerator 908.

With reference to FIGS. 5 and 10, video transport packets, such as, video stream data packet 407, includes a media access controller header, a UPD header, a video stream header 402, pixel payload 405, and frame checksum field 409. The video stream header 402 includes the protocol and version field, a sequence number field, and an extension field. The pixel data is carried in the pixel payload 405. In some embodiments, the video stream data packet 407 may be distinguished from other Ethernet packets by its destination address, protocol ID, IP port or similar attributes which instruct the network media access controller 904 to route the video stream data packet 407 into the video transport accelerator 908, rather than into a non-video path of data packets in some embodiments.

In the transmit path, the video transport packets are built by the video transport accelerator 908 on the transmit side by reading the blocks of data from the frame buffer for sending, building network packets (e.g., video transport packets) in hardware and passing the network packets to the media access controller 904 (FIG. 2). The receiving video transport accelerator 908 strips off the headers and pass only the pixel payload 405 into a receive frame buffer. In some embodiments, the standard Ethernet packet payload contains a video header (header 402) which further defines the video transport accelerator protocol version and flags, the packet sequence number, and future extension bits. For instance, the protocol may define the version and sub-version. The protocol may have associated negotiated parameters, like pixel format (RGB, NV12, YUV4:4:4, etc.), number of bits per pixel, and the number of pixels per line. With these parameters, the location of each pixel in an Ethernet packet payload may be easily identified in some embodiments. The selected mapping will be used to configure the video streaming controllers hardware.

The sequence number in the sequence number field defines the current number of the video stream data packet 407, in the Video Primitive. In some embodiments, the sequence number starts with zero on the start of each Video Primitive, which may be an entire picture. In some embodiments, the payload length is mapped to a number of pixels per line to start each new line in a new packet, for instance, have one scan line split into two video transfer packets. The total number of video packets in one frame buffer will be M, where M is an integer. In some embodiments, the user selects the most appropriate number of pixels per packet, depending on the pixel data format.

If any packets are missing (e.g., map or table 334 in FIG. 6), the video transport accelerator 908 detects this condition and proceeds to take corrective actions. In some embodiments, the corrective action includes: Automatic request for retransmission: the receiving video transport accelerator 908 sends the request to transmitter to re-send the missing packet. This request is sent after some pre-defined timeout to clear out any queues in the network infrastructure in some embodiments. The retransmitted packet replaces the void in the frame buffer, and the successfully received frame buffer may be reported to software via asserted interrupt. In some embodiments, the corrective action includes: correction through Forward Error Correction: the redundancy information may be used to re-create a missing packet. In some embodiments, methods with overlapping transmission (like Digital Fountain) may be used here with or without software assistance. Packet loss probability is expected to be low enough to not burden the CPU with this task in some instances. In some embodiments, the corrective action includes: Error Concealment: Visually sufficient error concealment may be implementing by replacing missing pixel block by the average of adjacent scan lines. When the entire buffer is received and (optionally) corrected, an interrupt may be asserted to CPU to indicate that an action, like display buffer flip, is required.

In some embodiments, the video transport accelerator 908 in the transmit path receives the specification of the video frame buffer 350 (FIG. 3B) for transmission with parameters the start address 360, the scan line lengths 352, the stride length 362, and the number of lines (e.g., 1-N). When the video frame buffer 350 is ready, the host processor (e.g., CPU) of video source 111 will start transmission by writing sequence number (=0) into configuration register.

The video transport accelerator 908 transfers data sequentially into the local buffer, and constructs the video stream data packet 407 by prepending the media access control header 401 and the video stream header 402. This operation may be implemented in sequential, streaming mode in hardware. Once the headers are passed on to the media access controller 904, the data fragment read from the frame buffer will be transferred to media access controller 904. At the end of the fragment, the cyclical redundancy check (e.g., CRC32) is appended to the packet in field 409 and the transmission will temporarily stop. If the sequence number is less than the maximum sequence number M, the transmit cycle will be repeated for the next frame buffer fragment. At the end of buffer transfer, the interrupt will be asserted to processor indicating that the video transport accelerator 908 is ready for transferring next frame.

The transmit and receive path of the video transport accelerator 908 optionally contains approved virtually lossless compression engine, for instance, VESA DSC Standard (DSC v.1.2) compression. The compression is more efficient in YUV 4:2:2 frame buffer layout in some embodiments. The compression can be negotiated by the initialization protocol implemented in software through regular network stack.

The video transport accelerator 908 optionally may contains content protection hardware, (e.g., the most current HDCP specification). The minimum hardware should then contain approved encryptor in the transmit path, and matching decryptor in the receive path. Security and other parameters for these engines may be provided by the software running on the host or appropriate embedded microcontroller and its operation is out of scope here.

Although examples of communications systems described above may include devices operating according to an Ethernet and other standards, it should be understood that embodiments of the systems and methods described can operate according to alternative standards and use wireless communications devices other than devices configured as devices. For example, multiple-unit communication interfaces associated with cellular networks, satellite communications, vehicle communication networks, wired networks, and networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment. The terms coupled or connected includes indirect and direct couplings and connections.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure. The headings provided in this document are non-limiting.

The network interface controller has been described above with the aid of functional building blocks illustrating the performance of certain significant functions. The boundaries of these functional building blocks have been arbitrarily defined for convenience of description. Functions and structures can be integrated together across such boundaries. Alternate boundaries could be defined as long as the certain significant functions are appropriately performed. Similarly, flow diagram blocks may also have been arbitrarily defined herein to illustrate certain significant functionality. To the extent used, the flow boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A device, comprising:
a data buffer configured to receive pixel data from a video interface;
a first controller configured to provide packets for a network interface, the packets comprising the pixel data; and
a second controller configured to monitor a fullness status of the data buffer and trigger the first controller to build a packet when enough data is available, wherein a portion of the pixel data for the packet is not removed from the data buffer for a time window when the portion can be retransmitted on request, wherein the second controller is configured to receive video streaming control protocol messages from an Ethernet network via the network interface, wherein at least one of the messages is interpreted in hardware and configured to trigger retransmission of the portion if the at least one of the messages arrived within the time window.

2. The device of claim 1, wherein the second controller is configured to provide the packet without host processor software recopying or reformatting the pixel data.

3. The device of claim 1, wherein the packet is configured for communication on a packet network, the packet network being a high speed Ethernet.

4. The device of claim 1, wherein the first controller is coupled to a video streaming controller.

5. The device of claim 1, wherein the second controller is a video control protocol controller.

6. The device of claim 1, wherein the portion is temporarily stored in a shadow buffer.

7. The device of claim 1, further comprising a camera comprising the video interface.

8. The device of claim 1, wherein the data buffer is a first in, first out memory.

9. The device of claim 1, where the data buffer stores four portions.

10. A device, comprising:
a system memory configured to receive pixel data from a video source;
a first controller configured to provide packets for a network interface using packet creation hardware, the packets comprising the pixel data; and
a second controller configured to monitor a fullness status of a data buffer and trigger the first controller to build a packet when enough data is available, wherein a portion of the pixel data for the packet is not removed from the data buffer for a time window when the portion can be retransmitted on request, wherein the second controller is configured to receive video streaming control protocol messages from an Ethernet network via the network interface, wherein at least one of the messages is interpreted in hardware and configured to trigger retransmission of the portion if the at least one of the messages arrived within the time window.

11. The device of claim 10, wherein the second controller is configured to provide the packet without host processor software recopying or reformatting the pixel data.

12. The device of claim 10, wherein the second controller is configured to provide the packet without host processor software recopying or reformatting the pixel data.

13. The device of claim 10, wherein the packet is configured for communication on a packet network, the packet network being a high speed Ethernet.

14. The device of claim 10, wherein the device is a single chip device or a system on a chip.

15. The device of claim 10, wherein the portion is temporarily stored in a shadow buffer in the system memory.

16. The device of claim 10, wherein the second controller is a video control protocol controller.

17. A method of transferring video data to an image processing system from a video source, the method comprising:
receiving pixel data from a video interface to a data buffer;
providing packets for a network interface, the packets comprising the pixel data;
monitor a fullness status of the data buffer and triggering a packet to be built when enough data is available, wherein a portion of the pixel data for the packet is not removed from the data buffer for a time window when the portion can be retransmitted on request, wherein first pixel data of the pixel data is transmitted when at least an entire portion of the pixel data is stored and is sent to a network at a network data rate higher than a data rate of the video interface; and receiving video streaming control protocol messages from an Ethernet network via the network interface, wherein at least one of the messages is interpreted in hardware and configured to trigger retransmission of the portion if the at least one of the messages arrived within the time window.

18. The method of claim 17, wherein the packet is provided without host processor software recopying or reformatting the pixel data.

19. The method of claim 17, wherein a video control protocol controller receives the video streaming control protocol messages.

20. The method of claim 17, further comprising:

temporarily storing the portion in a shadow buffer in the data buffer.

\*  \*  \*  \*  \*